United States Patent
Yang et al.

(10) Patent No.: US 11,686,383 B2
(45) Date of Patent: Jun. 27, 2023

(54) OIL MONITORING SYSTEM OF IN WHEEL TYPE RUNNING GEAR AND METHOD THEREOF

(71) Applicant: HYUNDAI MOBIS CO., LTD., Seoul (KR)

(72) Inventors: Hae Jun Yang, Yongin-si (KR); Yeo Jeong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 365 days.

(21) Appl. No.: 17/248,731

(22) Filed: Feb. 4, 2021

(65) Prior Publication Data
US 2021/0246977 A1    Aug. 12, 2021

(30) Foreign Application Priority Data
Feb. 10, 2020    (KR) .................. 10-2020-0015591

(51) Int. Cl.
*F16H 57/01*    (2012.01)
*F16H 57/04*    (2010.01)

(52) U.S. Cl.
CPC ......... *F16H 57/0405* (2013.01); *F16H 57/01* (2013.01); *F16H 2057/012* (2013.01)

(58) Field of Classification Search
CPC . F16H 57/0405; F16H 57/01; F16H 2057/012
USPC .......................................................... 184/108
See application file for complete search history.

(56) References Cited

U.S. PATENT DOCUMENTS

| | | | |
|---|---|---|---|
| 2005/0131599 A1* | 6/2005 | Inagawa ............ | G01N 33/2888 701/51 |
| 2012/0119897 A1* | 5/2012 | Oh ..................... | B60R 16/0234 340/457.4 |
| 2012/0290187 A1* | 11/2012 | Oesterreicher ... | B60W 50/0205 701/99 |
| 2015/0198233 A1* | 7/2015 | Furumoto ........... | F16H 57/0405 701/29.5 |

FOREIGN PATENT DOCUMENTS

KR    20190066357 A    * 12/2017

* cited by examiner

*Primary Examiner* — Gene O Crawford
*Assistant Examiner* — Emily R Kincaid
(74) *Attorney, Agent, or Firm* — NSIP Law

(57) ABSTRACT

The present disclosure periodically monitors an oil condition through a temperature sensor installed in a driving motor of an in-wheel-type running gear, the generated torque of the driving motor, or the like and transmits oil condition information to a driver through a vehicle warning light.

12 Claims, 5 Drawing Sheets

| PRODUCT NAME | OIL 1 | OIL 1 | OIL 1 |
|---|---|---|---|
| USAGE TIME | 5,000km | 1,300km | NEW OIL |
| Al | 40 | 20 | T |
| Ca | 1630 | 1680 | 1580 |
| Cu | 30 ← | 10 ← | T |
| Fe | 1040 ← | 230 ← | T |
| Mg | 10 | 10 | T |
| Si | 560 | 510 | T |

Fig.4

OIL MONITORING SYSTEM OF IN WHEEL TYPE RUNNING GEAR AND METHOD THEREOF

CROSS-REFERENCE TO RELATED APPLICATION

This application claims the benefit of priority to Korean Patent Application No. 10-2020-0015591, filed in the Korean Intellectual Property Office on Feb. 10, 2020, the entire contents of which are incorporated herein by reference.

TECHNICAL FIELD

The present disclosure relates to an oil monitoring system of an in-wheel-type running gear, and a method thereof, and more particularly, relates to an oil monitoring system of an in-wheel-type running gear that identifies an oil condition in the in-wheel-type running gear periodically or at all times to safely manage a vehicle, by periodically monitoring an oil condition through a temperature sensor installed in a driving motor of the in-wheel-type running gear, the generated torque of the driving motor, or the like and transmitting oil condition information to a driver through a vehicle warning light, and a method thereof.

BACKGROUND

Oil is essentially used when a gear is applied to an in-wheel-type running gear.

When oil in the in-wheel-type running gear is not properly managed and checked, stress may be concentrated on a contact surface of the gear, friction may increase on the contact surface of the gear, and wear on the contact surface of the gear may be accelerated in the lubrication of a gear device. Furthermore, as compared to oil in a normal state, mechanical components are rusted when foreign objects are mixed in oil. Accordingly, corrosion that affects mechanical strength characteristics may occur in parts such as bearings.

Because a conventional in-wheel-type running gear has no function to check an internal oil condition, the conventional in-wheel-type running gear has exchanged and checked oil periodically, instead of exchanging the oil depending on an oil condition. Moreover, when oil deterioration occurs due to driving and external environmental conditions, mechanical parts such as gears, bearings, and the like may be defective or damaged, thereby seriously affecting a driver's safety.

The conventional in-wheel-type running gear is equipped with a separate sensor for determining characteristics of a dielectric constant of oil. The conventional in-wheel-type running gear measures a capacitance, calculates a permittivity, and predicts the deterioration state of oil.

SUMMARY

The present disclosure has been made to solve the above-mentioned problems occurring in the prior art while advantages achieved by the prior art are maintained intact.

An aspect of the present disclosure provides an oil monitoring system and method of an in-wheel-type running gear that determines a temperature of oil in the in-wheel-type running gear by using a temperature sensor mounted on an in-wheel motor, determines a wear amount on a tooth face due to a torque generated by the in-wheel motor to determine a change of iron and copper components in oil, and estimates oil condition information due to the change in characteristics, for the purpose of periodically monitoring an oil condition through a temperature sensor installed in a driving motor of the in-wheel-type running gear, the generated torque of the driving motor, or the like and transmitting oil condition information to a driver through a vehicle warning light.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an oil monitoring system of an in-wheel-type running gear that manages safety of a vehicle by identifying oil deterioration in the in-wheel-type running gear may include a temperature sensor mounted on an in-wheel motor of the in-wheel-type running gear and measuring a temperature of the in-wheel motor, a torque sensor measuring a torque generated by the in-wheel motor, and a vehicle controller estimating a temperature of oil in the in-wheel-type running gear through the temperature of the in-wheel motor or estimating a condition of the oil by using a wear amount of a gear through torque generation of the in-wheel motor and transmitting warning information about the oil to a display when a calculated deterioration degree of the oil is not less than a predetermined reference value.

In an embodiment, the oil monitoring system of the in-wheel-type running gear may further include a distance measurement sensor measuring a driving distance of the vehicle. The vehicle controller may deliver the warning information about the oil to the display when the deterioration degree of the oil calculated through a driving distance of the vehicle is not less than the predetermined reference value.

In an embodiment, the vehicle controller may determine that the vehicle is driving in a maximum output section, when the torque generated by the in-wheel motor is not less than 50% of a maximum torque and may determine that the vehicle is driving in a continuous output section, when the torque generated by the in-wheel motor is less than 50% of the maximum torque.

In an embodiment, the vehicle controller may determine that the vehicle is driving in a continuous output section, when a time belonging to a specific range is within a time range while a temperature change of the in-wheel motor is within the specific range and may determine that the vehicle is driving in a maximum output section, when the temperature change of the in-wheel motor is out of the specific range.

In an embodiment, the vehicle controller may estimate a permittivity according to the temperature of the oil after estimating the temperature of the oil in the in-wheel-type running gear and may assign a weight according to the temperature of the oil to calculate the deterioration degree of the oil.

In an embodiment, the vehicle controller may calculate the deterioration degree of the oil by assigning a weight to the wear amount of the gear through torque generation of the in-wheel motor.

According to an aspect of the present disclosure, an oil monitoring method of an in-wheel-type running gear that manages safety of a vehicle by identifying an oil condition in the in-wheel-type running gear may include measuring a temperature of an in-wheel motor through a temperature sensor mounted on the in-wheel motor of the in-wheel-type running gear, measuring a torque generated by the in-wheel motor through a torque sensor mounted on the in-wheel motor, and transmitting warning information about oil to a display when a calculated deterioration degree of the oil is not less than a predetermined reference value, after estimating a temperature of the oil in the in-wheel-type running gear through the temperature of the in-wheel motor or estimating a condition of the oil by using a wear amount of a gear through torque generation of the in-wheel motor.

In an embodiment, the oil monitoring method of the in-wheel-type running gear may further include measuring a driving distance of the vehicle through a distance measurement sensor.

The transmitting of the warning information may include delivering the warning information about the oil to the display when the deterioration degree of the oil calculated through a driving distance of the vehicle is not less than the predetermined reference value.

In an embodiment, the transmitting of the warning information may include determining that the vehicle driving is in a maximum output section, when the torque generated by the in-wheel motor is not less than 50% of a maximum torque and determining that the vehicle driving is in a continuous output section, when the torque generated by the in-wheel motor is less than 50% of the maximum torque.

In an embodiment, the transmitting of the warning information may include determining that the vehicle driving is in a continuous output section, when a time belonging to a specific range is within a time range while a temperature change of the in-wheel motor is within the specific range and determining that the vehicle driving is in a maximum output section, when the temperature change of the in-wheel motor is out of the specific range.

In an embodiment, the transmitting of the warning information may include estimating a permittivity according to the temperature of the oil after estimating the temperature of the oil in the in-wheel-type running gear and assigning a weight according to the temperature of the oil to calculate the deterioration degree of the oil.

In an embodiment, the transmitting of the warning information may include calculating the deterioration degree of the oil by assigning a weight to the wear amount of the gear through torque generation of the in-wheel motor.

BRIEF DESCRIPTION OF THE DRAWINGS

The above and other objects, features and advantages of the present disclosure will be more apparent from the following detailed description taken in conjunction with the accompanying drawings:

FIG. 4 is a view illustrating an oil component analysis result according to a vehicle driving distance in an oil monitoring system of an in-wheel-type running gear, according to an embodiment of the present disclosure.

DETAILED DESCRIPTION

Figure 1:
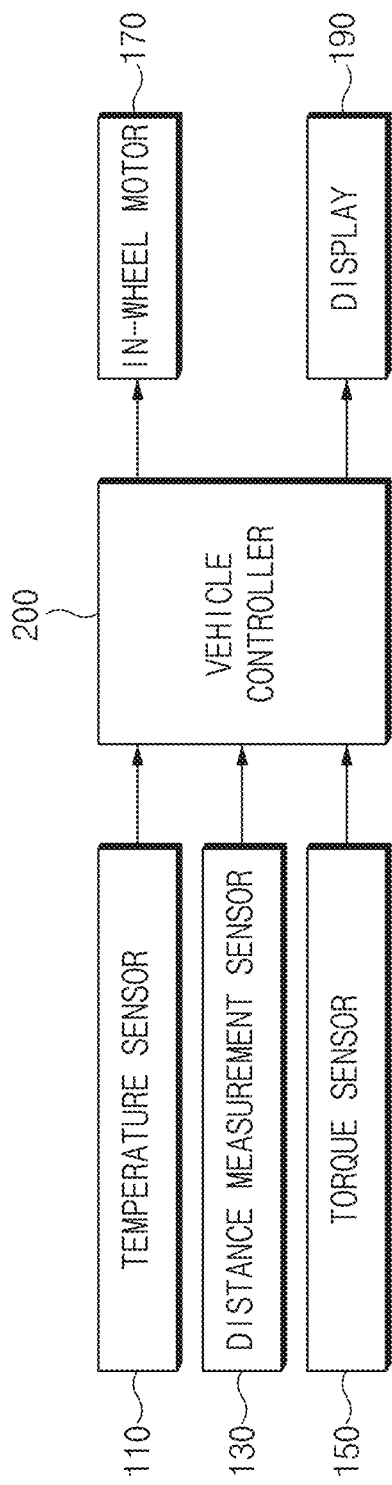
FIG. 1 is a block diagram illustrating an oil monitoring system of an in-wheel-type running gear according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 8.

Figure 2:
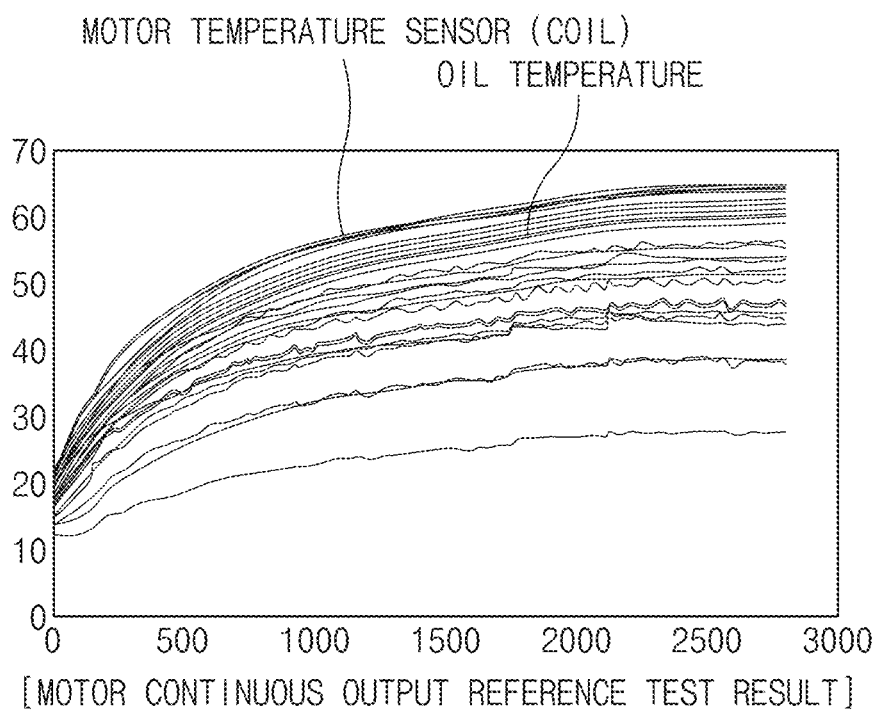
FIG. 2 is a view illustrating a motor temperature and an oil temperature in an oil monitoring system of an in-wheel-type running gear at a continuous motor output according to an embodiment of the present disclosure.
Figure 3:
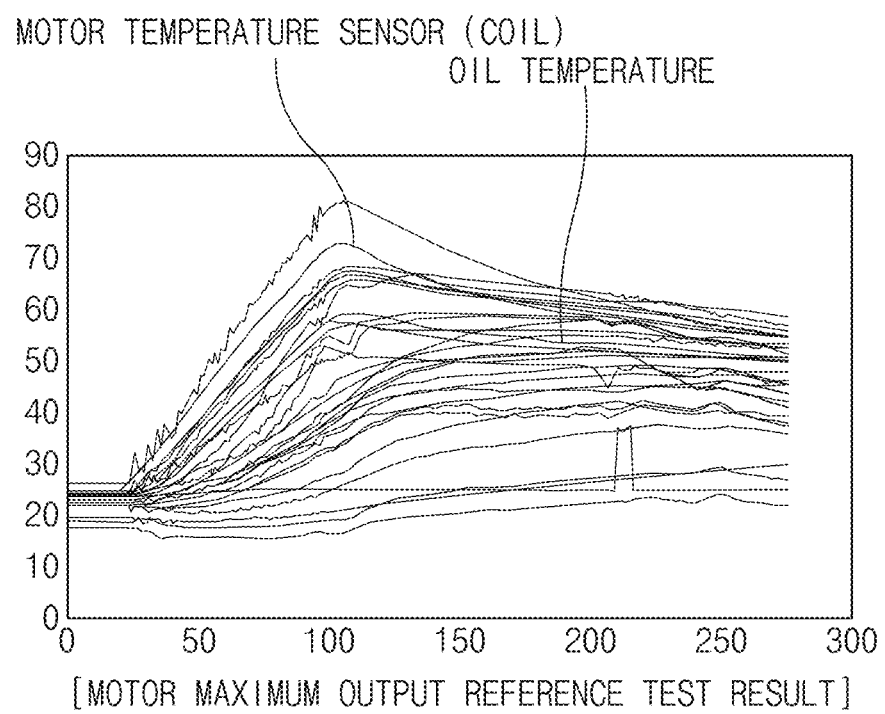
FIG. 3 is a view illustrating a motor temperature and an oil temperature in an oil monitoring system of an in-wheel-type running gear at a maximum motor output according to an embodiment of the present disclosure.
Figure 5:
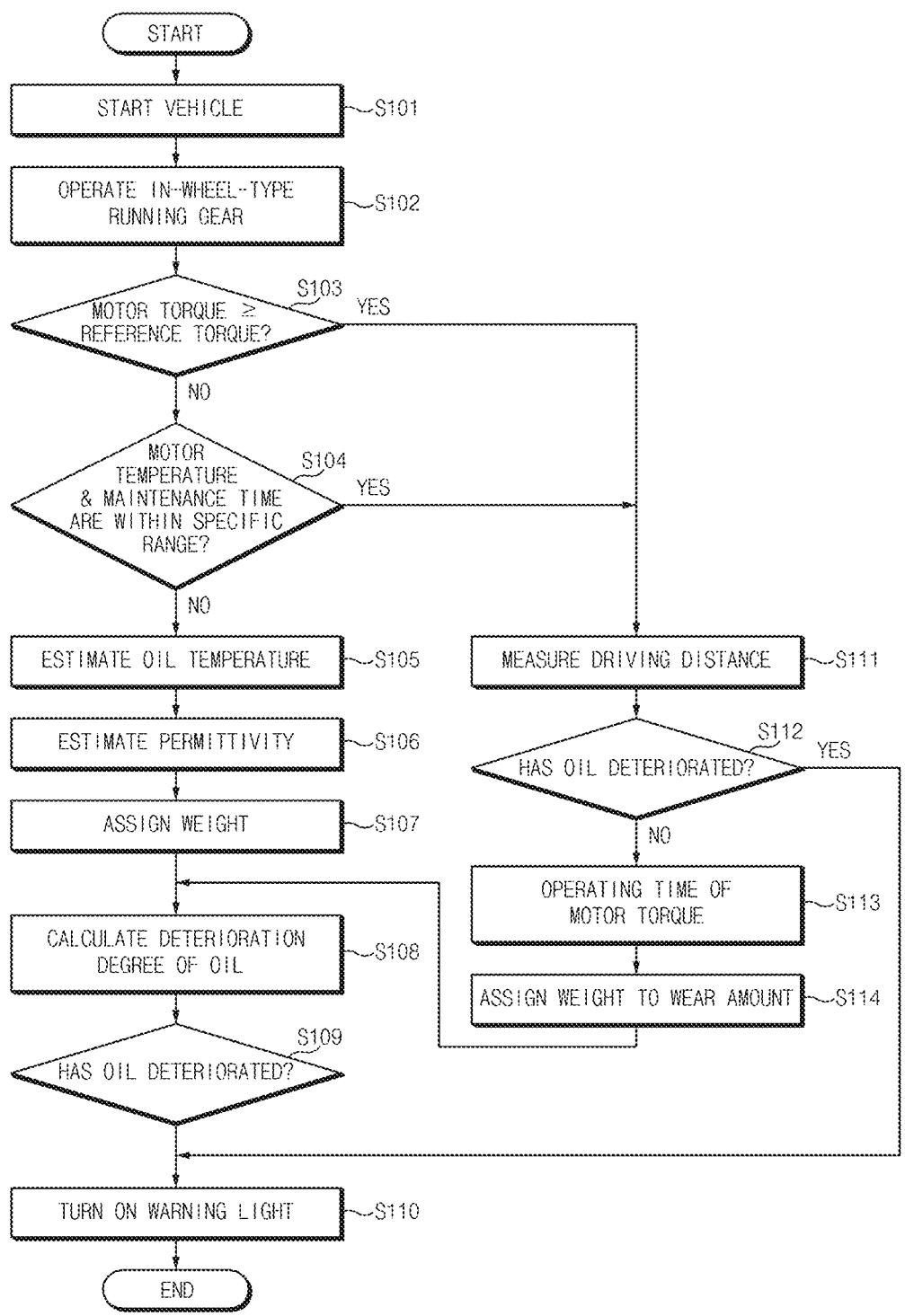
FIG. 5 is a flowchart illustrating an oil monitoring method of an in-wheel-type running gear according to an embodiment of the present disclosure.

FIG. 1 is a block diagram illustrating an oil monitoring system of an in-wheel-type running gear according to an embodiment of the present disclosure. FIG. 2 is a view illustrating a motor temperature and an oil temperature in an oil monitoring system of an in-wheel-type running gear at a continuous motor output according to an embodiment of the present disclosure. FIG. 3 is a view illustrating a motor temperature and an oil temperature in an oil monitoring system of an in-wheel-type running gear at a maximum motor output according to an embodiment of the present disclosure. FIG. 4 is a table illustrating an oil component analysis result according to a vehicle driving distance in an oil monitoring system of an in-wheel-type running gear according to an embodiment of the present disclosure. FIG. 5 is a flowchart illustrating an oil monitoring method of an in-wheel-type running gear according to an embodiment of the present disclosure.

Referring to FIG. 1, an oil monitoring system of an in-wheel-type running gear according to an embodiment of the present disclosure may manage the safety of a vehicle by identifying oil deterioration in the in-wheel-type running gear, and may include a temperature sensor 110, a distance measurement sensor 130, a torque sensor 150, an in-wheel motor 170, a display 190, and a vehicle controller 200.

In an embodiment, oil is essentially used when a gear is applied to the in-wheel-type running gear.

When oil in the in-wheel-type running gear is not properly managed and checked, stress may be concentrated on a contact surface of the gear, friction may increase on the contact surface of the gear, and wear on the contact surface of the gear may be accelerated, in the lubrication of a gear device.

Furthermore, as compared to oil in a normal state, mechanical components are rusted when foreign objects are mixed in oil. Accordingly, corrosion that affects mechanical strength characteristics may occur in parts such as bearings.

The oil in the in-wheel-type running gear may function as a lubrication function, a cooling function, and a clean dispersion function. The life-span or usage of oil may be limited by deterioration.

The deterioration may be determined by the oxidation of oil and the inflow of foreign objects. An oxidation rate of oil may vary depending on temperature, catalyst, a type of oil contacting air, and a type of additive.

When oil is oxidized, oil-soluble oxygen compounds may be generated first. The generated material may be an organic acid, and a dendritic material that does not dissolve oil may be eventually generated.

The temperature sensor 110 may be mounted on the in-wheel motor 170 of the in-wheel-type running gear to measure a temperature of the in-wheel motor 170. The distance measurement sensor 130 may measure a driving distance of a vehicle. The torque sensor 150 may measure a torque generated by the in-wheel motor 170.

The in-wheel motor 170 may be provided on both left and right wheels of the vehicle. The in-wheel motor 170 may receive a three-phase drive current through an inverter and may supply power to both the left wheel and the right wheel. The in-wheel motor 170 may be driven through an in-wheel motor driving device controlled by the vehicle controller 200.

The vehicle controller 200 may manage the safety of a vehicle by identifying an oil condition in the in-wheel-type running gear periodically or at all times. The vehicle controller 200 may periodically determine an oil condition by using the temperature sensor 110, the distance measurement sensor 130, and the torque sensor 150 and may deliver a warning about oil deterioration to a driver through the display 190 included in the vehicle.

When a vehicle may be started (S101) and the in-wheel-type running gear operates (S102), the vehicle controller 200 may identify a torque generated by the in-wheel motor 170 through the torque sensor 150 (S103).

At this time, the vehicle controller 200 may set a torque corresponding to 50% of the maximum torque of the in-wheel motor 170 as a reference torque, and may compare the torque generated by the in-wheel motor 170 with a reference torque. When the torque generated by the in-wheel motor 170 is less than the reference torque, the vehicle controller 200 may determine that a vehicle is driving in a continuous output section. When the torque generated by the in-wheel motor 170 is not less than the reference torque, the vehicle controller 200 may determine that the vehicle is driving in a maximum output section.

Herein, the continuous output section may correspond to a section in which a vehicle is driving on a flat road at a constant speed. The maximum output section may correspond to a section requiring instantaneous high torque, such as a hill, a sloping uphill road, or the like.

Next, the temperature of the in-wheel motor 170 may be measured through the temperature sensor 110 mounted on the in-wheel motor 170 of the in-wheel-type running gear (S104).

At this time, when a temperature change of the in-wheel motor 170 is within a specific range and when a time belonging to the specific range is within a specific time range, the vehicle controller 200 may determine that a vehicle is driving in a continuous output section. When a temperature change of the in-wheel motor 170 is out of the specific range, the vehicle controller 200 may determine that the vehicle is driving in a maximum output section.

For example, when a temperature change of the in-wheel motor 170 is within a range between −3 degrees and +3 degrees and when a time belonging to the range between −3 degrees and +3 degrees is within a time range between −5 seconds and +5 seconds, the vehicle controller 200 may determine that the vehicle is driving in a continuous output section. When the temperature change of the in-wheel motor 170 is out of the range between −3 degrees and +3 degrees, the vehicle controller 200 may determine that the vehicle is driving in a maximum output section.

Next, the vehicle controller 200 may identify the torque of the in-wheel motor 170. When the result of identifying the temperature of the in-wheel motor 170 indicates that it is determined the vehicle is driving in the continuous output section, the vehicle controller 200 may estimate the oil temperature.

Referring to FIG. 2, the oil temperature may be estimated by the temperature sensor 110 provided in the in-wheel motor 170 (S105). Referring to Table 1, the vehicle controller 200 may estimate a permittivity according to the oil temperature by using a predetermined look-up table (S106). Next, the vehicle controller 200 may assign a weight according to the oil temperature (S107).

TABLE 1

| Oil temperature | Permittivity | Permittivity weight |
|---|---|---|
| 70 | 2.50 | 1 |
| 80 | 2.55 | 1.05XX |
| 90 | 2.70 | 1.1XXX |
| 100 | 2.95 | 1.2XXX |
| 110 | 3.35 | 1.4XXX |
| 120 | 4.05 | 1.7XXX |
| 130 | 5.00 | 2.0000 |

In an embodiment, it is possible to know a dielectric constant for respective oil according to a temperature. When the specification of oil applied to the in-wheel-type running gear is determined, it is possible to know the dielectric constant for each temperature of oil according to the specification. The oil dielectric constant according to a temperature may be tested by a user, but may be provided by a manufacturer (a provider).

Dielectric constant test data may be illustrated by using a graph of a quadratic function. Logic (calculation) for determining the temperature of oil in an in-wheel-type running gear may be applied.

In this way, the vehicle controller 200 estimates an oil temperature, estimates a permittivity according to the oil temperature, assigns a weight according to the oil temperature (S108), and compares a value, which is obtained by assigning a weight, with a criterion for evaluating the degree of oil deterioration (S109).

For example, when it is estimated that the oil temperature is 70 degrees, the permittivity according to the oil temperature is 2.50, and when a value, which is obtained by assigning a weight of 1, does not exceed the criterion for evaluating the degree of oil deterioration, it may be determined that oil has not deteriorated.

On the other hand, when it is estimated that the oil temperature is 130 degrees, when the permittivity according to the oil temperature is 5.00, and when a value, which is obtained by assigning a weight of 2, exceeds the criterion for evaluating the degree of oil deterioration, it may be determined that oil has deteriorated. The vehicle controller 200 may transmit a warning about oil degradation to the display 190 inside the vehicle and then may allow a driver to exchange the oil (S110).

In the meantime, referring to FIG. 3, the vehicle controller 200 may identify the torque of the in-wheel motor 170. When the result of identifying the temperature of the in-wheel motor 170 indicates that it is determined that the vehicle is driving in the maximum output section, the vehicle controller 200 may identify the driving distance of a vehicle measured by the distance measurement sensor 130 (S111).

Accordingly, when the driving distance of the vehicle is enough to the extent to which oil has deteriorated, the vehicle controller 200 may determine that there is a need to exchange the oil (S112).

For example, referring to Equation 1, when a value of Max for determining oil deterioration is not less than 0.5, it may be determined that oil has been deteriorated. Accordingly, when the driving distance of the vehicle is not less than 8000 km, the value of Max becomes 0.5 by Equation 1.

$$Max=0.0000625*distance \quad \text{[Equation 1]}$$

For example, when the driving distance of the vehicle is not less than 8000 km, the deterioration degree of oil becomes 0.5, it may be determined that oil has deteriorated. The vehicle controller 200 may transmit a warning about oil degradation to the display 190 inside the vehicle and then may allow a driver to exchange the oil (S113).

Meanwhile, when the driving distance of the vehicle is less than 8000 km, the vehicle controller 200 may identify the torque and operating time of the in-wheel motor 170, and may assign a weight of a gear wear amount according to a torque (S114).

Referring to Table 2, the torque of the in-wheel motor 170 may be identified by using a predetermined look-up table. Next, the weight of the gear wear amount according to a torque may be assigned.

TABLE 2

| Motor torque | Weight |
| --- | --- |
| Continuous output reference of 10 kW | 1 |
| 11 | 1.1XXX |
| 12 | 1.2XXX |
| 13 | 1.8XXX |
| 22 | 1.9XXX |
| Maximum output reference of 23 kW | 2 |

In this way, the vehicle controller 200 may compare a value obtained by assigning the weight to the torque with the criteria for evaluating the degree of oil deterioration.

For example, when the driving distance of the vehicle is less than 8000 km, and when a value, which is obtained by assigning a weight of 1 to a continuous output of 10 kW or by assigning a weight of 2 to a maximum output of 23 kW, exceeds the criteria for evaluating the degree of oil deterioration, it may be determined that oil has deteriorated. The vehicle controller 200 may transmit a warning about oil degradation to the display 190 inside the vehicle and then may allow a driver to exchange the oil.

Besides, the vehicle controller 200 may identify a wear amount of a gear tooth face by using a torque generated by the in-wheel motor 170 and may determine changes in iron (Fe) and copper (Cu) components in oil. The wear amount of a gear increases depending on the driving distance of a vehicle, and thus metal components in oil may increase. Accordingly, as the wear amount of a gear increases due to braking torque when the in-wheel-type running gear is in operation, the concentrations of Fe and Cu in oil may increase.

Referring to FIG. 4, it is possible to know an oil component in the in-wheel-type running gear according to a driving distance of a vehicle. It may be seen that the content of Fe and Cu components increases as a usage time (i.e., operating time) increases.

As described above, according to an oil monitoring system and method of an in-wheel-type running gear may determine a temperature of oil in the in-wheel-type running gear by using a temperature sensor mounted on an in-wheel motor, may determine a wear amount on a tooth face due to a torque generated by the in-wheel motor to determine a change of iron and copper components in oil, and may estimate oil condition information due to the change in characteristics, for the purpose of periodically monitoring an oil condition through a temperature sensor installed in a driving motor of the in-wheel-type running gear, the generated torque of the driving motor, or the like and transmitting oil condition information to a driver through a vehicle warning light.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The present technology may determine a temperature of oil in the in-wheel-type running gear by using a temperature sensor mounted on an in-wheel motor, may determine a wear amount on a tooth face due to a torque generated by the in-wheel motor to determine a change of iron and copper components in oil, and may estimate oil condition information due to the change in characteristics for the purpose of periodically monitoring an oil condition through a temperature sensor installed in a driving motor of the in-wheel-type running gear, the generated torque of the driving motor, or the like and transmitting oil condition information to a driver through a vehicle warning light. Accordingly, it is possible to safely manage a vehicle by determining an oil condition in the in-wheel-type running gear periodically or at all times.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An oil monitoring system of an in-wheel-type running gear that manages safety of a vehicle by identifying oil deterioration in the in-wheel-type running gear, the system comprising:
a temperature sensor mounted on an in-wheel motor of the in-wheel-type running gear and configured to measure a temperature of the in-wheel motor;

a torque sensor configured to measure a torque generated by the in-wheel motor; and
a vehicle controller configured to:
estimate a temperature of oil in the in-wheel-type running gear through the temperature of the in-wheel motor or estimate a condition of the oil by using a wear amount of a gear through torque generation of the in-wheel motor; and
transmit warning information about the oil to a display when a calculated deterioration degree of the oil is not less than a predetermined reference value.

2. The system of claim 1, further comprising:
a distance measurement sensor configured to measure a driving distance of the vehicle,
wherein the vehicle controller is configured to:
deliver the warning information about the oil to the display when the deterioration degree of the oil calculated through a driving distance of the vehicle is not less than the predetermined reference value.

3. The system of claim 1, wherein the vehicle controller is configured to:
determine that the vehicle is driving in a maximum output section, when the torque generated by the in-wheel motor is not less than 50% of a maximum torque; and
determine that the vehicle is driving in a continuous output section, when the torque generated by the in-wheel motor is less than 50% of the maximum torque.

4. The system of claim 1, wherein the vehicle controller is configured to:
determine that the vehicle is driving in a continuous output section, when a time belonging to a specific range is maintained during a specific time while a temperature change of the in-wheel motor is within the specific range; and
determine that the vehicle is driving in a maximum output section, when the temperature change of the in-wheel motor is out of the specific range.

5. The system of claim 1, wherein the vehicle controller is configured to:
estimate a permittivity according to the temperature of the oil after estimating the temperature of the oil in the in-wheel-type running gear; and
assign a weight according to the temperature of the oil to calculate the deterioration degree of the oil.

6. The system of claim 1, wherein the vehicle controller is configured to:
calculate the deterioration degree of the oil by assigning a weight to the wear amount of the gear through torque generation of the in-wheel motor.

7. An oil monitoring method of an in-wheel-type running gear that manages safety of a vehicle by identifying an oil condition in the in-wheel-type running gear, the method comprising:
measuring a temperature of an in-wheel motor through a temperature sensor mounted on the in-wheel motor of the in-wheel-type running gear;
measuring a torque generated by the in-wheel motor through a torque sensor mounted on the in-wheel motor; and
transmitting warning information about oil to a display when a calculated deterioration degree of the oil is not less than a predetermined reference value, after estimating a temperature of the oil in the in-wheel-type running gear through the temperature of the in-wheel motor or estimating a condition of the oil by using a wear amount of a gear through torque generation of the in-wheel motor.

8. The method of claim 7, further comprising:
measuring a driving distance of the vehicle through a distance measurement sensor,
wherein the transmitting of the warning information includes:
delivering the warning information about the oil to the display when the deterioration degree of the oil calculated through a driving distance of the vehicle is not less than the predetermined reference value.

9. The method of claim 7, wherein the transmitting of the warning information includes:
determining that the vehicle driving is in a maximum output section, when the torque generated by the in-wheel motor is not less than 50% of a maximum torque; and
determining that the vehicle driving is in a continuous output section, when the torque generated by the in-wheel motor is less than 50% of the maximum torque.

10. The method of claim 7, wherein the transmitting of the warning information includes:
determining that the vehicle driving is in a continuous output section, when a time belonging to a specific range is maintained during a specific time while a temperature change of the in-wheel motor is within the specific range; and
determining that the vehicle driving is in a maximum output section, when the temperature change of the in-wheel motor is out of the specific range.

11. The method of claim 7, wherein the transmitting of the warning information includes:
estimating a permittivity according to the temperature of the oil after estimating the temperature of the oil in the in-wheel-type running gear; and
assigning a weight according to the temperature of the oil to calculate the deterioration degree of the oil.

12. The method of claim 7, wherein the transmitting of the warning information includes:
calculating the deterioration degree of the oil by assigning a weight to the wear amount of the gear through torque generation of the in-wheel motor.

* * * * *